(12) United States Patent
Bautista-Lloyd et al.

(10) Patent No.: US 7,000,008 B2
(45) Date of Patent: Feb. 14, 2006

(54) METHOD, SYSTEM, AND PROGRAM FOR PROVIDING DATA UPDATES TO A PAGE INCLUDING MULTIPLE REGIONS OF DYNAMIC CONTENT

(75) Inventors: David Bautista-Lloyd, Broomfield, CO (US); Arieh Markel, Lafayette, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 799 days.

(21) Appl. No.: 09/836,125

(22) Filed: Apr. 16, 2001

(65) Prior Publication Data

US 2002/0152239 A1 Oct. 17, 2002

(51) Int. Cl.
*G06F 15/16* (2006.01)

(52) U.S. Cl. .................. 709/219; 709/203; 709/228; 709/236

(58) Field of Classification Search ............... 709/203, 709/217, 219, 229, 232, 228, 236
See application file for complete search history.

(56) References Cited

U.S. PATENT DOCUMENTS

| | | | | |
|---|---|---|---|---|
| 5,899,990 A | * | 5/1999 | Maritzen et al. ............... | 707/4 |
| 5,925,100 A | * | 7/1999 | Drewry et al. ............... | 709/219 |
| 5,956,714 A | * | 9/1999 | Condon ........................ | 707/8 |
| 5,978,828 A | | 11/1999 | Greer et al. | |
| 6,021,437 A | * | 2/2000 | Chen et al. .................. | 709/224 |
| 6,163,794 A | * | 12/2000 | Lange et al. ................ | 709/202 |
| 6,247,056 B1 | * | 6/2001 | Chou et al. .................. | 709/229 |
| 6,347,341 B1 | * | 2/2002 | Glassen et al. ............. | 709/250 |
| 6,442,565 B1 | * | 8/2002 | Tyra et al. ................... | 707/102 |
| 6,470,386 B1 | * | 10/2002 | Combar et al. ............. | 709/224 |
| 6,480,883 B1 | * | 11/2002 | Tsutsumitake .............. | 709/203 |
| 6,591,266 B1 | * | 7/2003 | Li et al. ....................... | 707/10 |
| 6,633,899 B1 | * | 10/2003 | Coward ...................... | 709/202 |
| 6,633,914 B1 | * | 10/2003 | Bayeh et al. ............... | 709/227 |
| 6,701,368 B1 | * | 3/2004 | Chennapragada et al. .. | 709/228 |
| 6,738,804 B1 | * | 5/2004 | Lo .............................. | 709/219 |
| 2002/0016839 A1 | * | 2/2002 | Smith et al. ................ | 709/224 |

(Continued)

FOREIGN PATENT DOCUMENTS

WO WO 01/63466 8/2001

OTHER PUBLICATIONS http://www.webopedia.com/TERM/q/queue.html, visited Feb. 15, 2005.*

(Continued)

*Primary Examiner*—John Follansbee
*Assistant Examiner*—Aaron C. Perez-Daple
(74) *Attorney, Agent, or Firm*—Chapin & Huang, L.L.C.; Barry W. Chapin, Esq.

(57) ABSTRACT

Disclosed is a method, system, and program for providing data updates to a page, wherein the page includes multiple regions of dynamic content that may be separately updated independently of each other. The regions of the page are displayed within a presentation program executing on a client. A server transfers the page to the client over a network. The server detects state changes and queues information on the state changes. The server further generates an update package including content indicating the state changes and sends the update package to the client. The presentation program in the client renders the information on the state changes to the regions of the page including the dynamic content modified by the content indicating the state changes.

28 Claims, 10 Drawing Sheets

U.S. PATENT DOCUMENTS

2002/0138568 A1 * 9/2002 Johansson .................... 709/203
2003/0093585 A1 * 5/2003 Allan ......................... 709/330

OTHER PUBLICATIONS

Stevens, W. Richard, "TCP/IP Illustrated, vol. 1" New York, 1994, p. 2.*

International Application No. PCT/US02/11703, International Search Report, dated of mailing Aug. 8, 2003.

Betz, K., et al. "*Developing Highly-Responsive User Interfaces with DHTML and Servlets.*" Performance, Computing, and Communications Conference 2000. IPCCC '00 Conference Proceeding of the IEEE International, Phoenix, AZ, USA Feb. 20-22, 2000, Piscataway, NJ, USA, IEEE, US, Feb. 20, 2000, pp. 437-443.

Sun Microsystems, Inc. "Sun StorEdge Component Manager 2.1 User's Guide", Jul. 2000, Revision A.

* cited by examiner

METHOD, SYSTEM, AND PROGRAM FOR PROVIDING DATA UPDATES TO A PAGE INCLUDING MULTIPLE REGIONS OF DYNAMIC CONTENT

BACKGROUND OF THE INVENTION

1. Field of the Invention

The present invention relates to a method, system, and program for providing data updates to a page including multiple regions of dynamic content.

2. Description of the Related Art

A web browser program may download and display a web page, such as a Hypertext Markup Language (HTML), Extensible Markup Language (XML), etc., from a server using the HyperText Transfer Protocol (HTTP). The web page may include dynamic content that is gathered from a database or other application program at the server end. In cases where the dynamic content is frequently changing, the web browser will periodically request further data from the server. In the current art, a web page including dynamic content that needs to be periodically refreshed would include a META-REFRESH tag in the web page to cause the client web browser to automatically submit additional HTTP GET requests at specified time intervals to refresh the content of in the displayed web page and update the dynamic content.

Many web pages may include multiple HTML frames including different sections of dynamic content that may change at the server at different rates. In the current art, there would be one META-REFRESH tag included in each separate frame to update dynamic data even if the dynamic content in certain frames or sections of the page has not changed. Thus, a separate frame update request is generated for each frame to refresh the data. This current art refresh technique unnecessarily increases network bandwidth and server load by updating dynamic content in the frames that may have not changed. The cumulative effect on network bandwidth and server load of numerous web browsers automatically refreshing each frame in the page when the dynamic content has not changed may be significant. The stress on network bandwidth and server load further increases as additional frames of dynamic content are included in a single web page requiring additional refresh requests and as the number of users accessing such web page increases.

For these reasons, there is a need in the art for an improved technique for updating pages rendered in viewer programs that include dynamic content.

SUMMARY OF THE PREFERRED EMBODIMENTS

Provided is a method, system, and program for providing data updates to a page, wherein the page includes multiple regions of dynamic content that may be separately updated independently of each other. The regions of the page are displayed within a presentation program executing on a client. A server transfers the page to the client over a network. The server detects state changes and queues information on the state changes. The server further generates an update package including content indicating the detected state changes and sends the update package to the client. The presentation program in the client renders the information on the state changes to the regions of the page including the dynamic content modified by the content indicating the state changes.

BRIEF DESCRIPTION OF THE DRAWINGS

Referring now to the drawings in which like reference numbers represents corresponding parts throughout:

FIGS. 13 and 14 illustrate examples of pages displayed with frames of status and property information in accordance with implementations of the invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
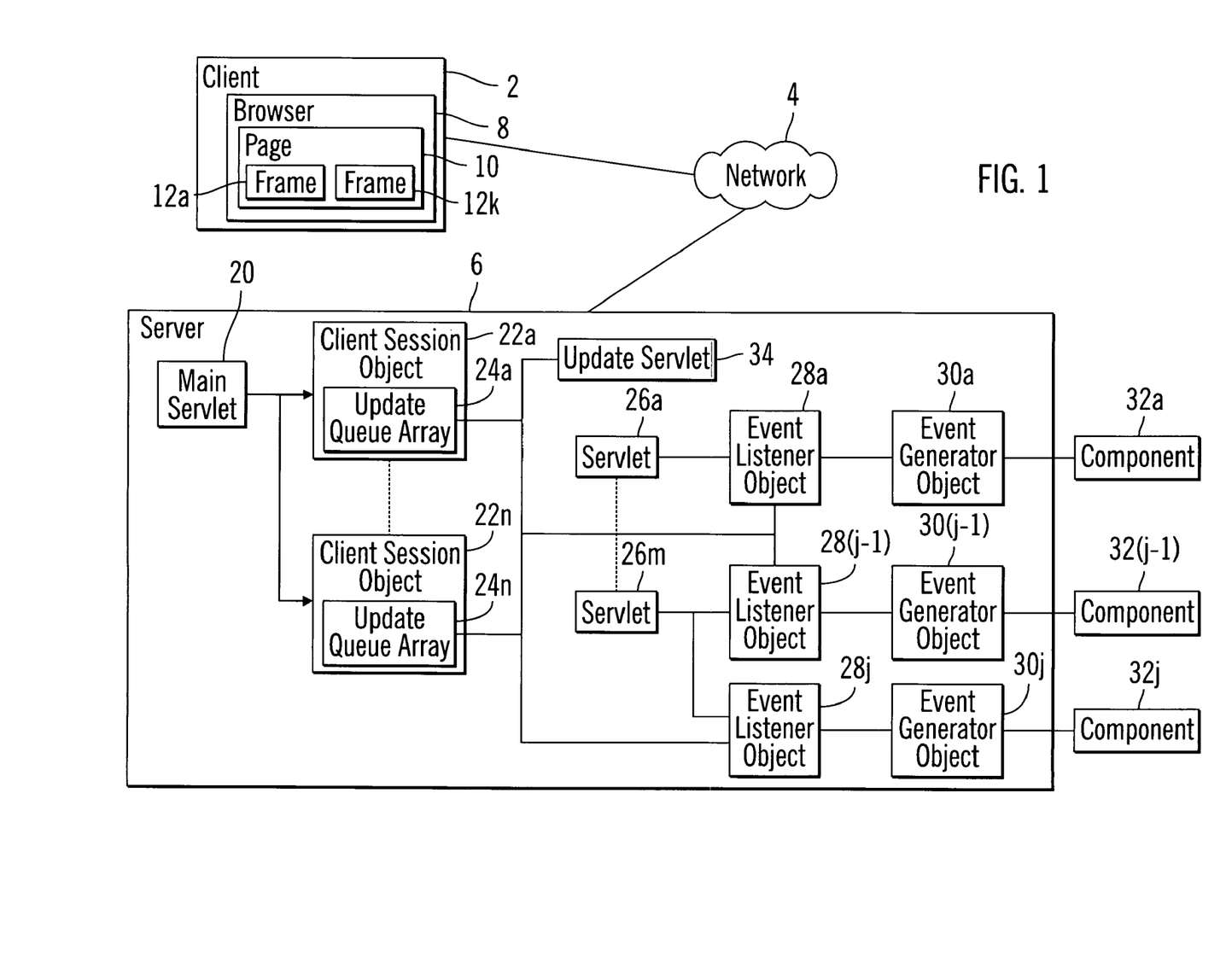
FIG. 1 illustrates a computer architecture in which aspects of the invention are implemented.

FIG. 1 illustrates a network computing environment in which aspects of the invention are implemented. A client computer 2 and server computer 6 communicate over a network 4, such as a Local Area Network (LAN), Wide Area Network (WAN), Storage Area Network (SAN), the Internet, an Intranet, etc., using a network protocol known in the art, e.g., Ethernet, Fibre Channel, TCP/IP, HyperText Transfer Protocol (HTTP), File Transfer Protocol (FTP), Fibre Channel, etc. The client includes a browser program 8, such as an HTML browser capable of downloading and rendering a page 10 of content from the server 6 using a network transfer protocol, such as HTTP, etc. In certain described implementations, the page 10 includes multiple frames 12a . . . k, i.e., independent regions or subwindows of the page 10, where the content in each frame can be updated independently of other frames. For instance, the frames 12a . . . k may comprise HTML frames which display content from different web pages, i.e., content at different Universal Resource Locator (URL) addresses, in the same main browser 8 window. The client 2 may comprise any computing device known in the art, such as a personal computer, workstation, laptop computer, hand held computer, telephony device, mainframe, server, etc. The server 6 comprises a server-class machine or any other type of computing device capable of responding to data requests from the client 2.

The server 6 implements a component architecture to provide updates to the frames 12a . . . k in the client browser 8. In certain implementations, the component architecture utilizes Java Servlets.** A Java Servlet comprises Java source code that is typically used to add functionality to a web server to respond to information requests from clients over a network 4. A servlet is typically a server side program component that remains persistent in memory of the server. Although certain of the implementations are described with respect to Java servlets, the program components of the server architecture described herein may be implemented using any component or programming technology known in the art, and the invention is not limited to the Java programming language or servlet architecture. Still alternatively, the servlets may be implemented as objects and methods of a Java class. In the described implementations, the client browser 8 is requesting a web page 10 that includes multiple frames 12a . . . k that receive dynamic content from different sources. For instance, the content the server 6 gathers and returns to the browser 8 may comprise data in a database or information on the status of a system or multiple systems monitored by the server 6, or controls to access further system information.

**Java, StorEdge, Jiro are trademarks of Sun Microsystems, Inc.

A main servlet 20 handles the initial requests from the client 2 for the page 10. In response, the main servlet 20 generates a client session object 22a . . . n and an update queue 24a . . . n for each client session object 22a . . . n. Thus, one client session object 22a . . . n is maintained for each client 2 requesting the page of status and property information from the server 6. Each update queue 24a . . . n includes an array of queues, where each queue is used to store updates to the dynamic data within one of the frames 12a . . . k. A servlet 26a . . . m is provided for each type of component being monitored, such as a type of database or data source or a type of device, e.g., a specific type of storage device, switch, field replaceable unit (FRU), etc. Each servlet 26a . . . m generates one or more event listener objects 28a . . . j for each instance of the component type monitored by the servlet 26a . . . m. For instance, if a servlet 26a . . . m is associated with a particular type of storage device, e.g., a particular Redundant Array of Independent Disks (RAID) storage system, then one event listener object could be created for each instance of that particular type of RAID system to allow for independent monitoring of events at different instances of the component type. The event listener objects may be a member of an event listener Java class.

An event generator object 30a . . . j is instantiated to monitor states at one instance of a particular type of component 32a . . . j managed by the server 6. The component instances 32a . . . j may comprise data sources, e.g., databases within the server 6 platform, or may comprise data sources or devices separate from the server 6. Upon detecting a state change, the event generator objects 30a . . . j send a notification to any registered event listener objects 28a . . . j including parameters describing the state change. The event generator objects may be a member of an event generator Java class.

An update servlet 34 provides status and property updates maintained in the update queue array 24a . . . n to the browser 8 in response to refresh requests by the browser 8.

In certain implementations, the components 32a . . . j monitored by the server 6 may comprise field replaceable units (FRUs) and the events monitored may comprise the status and properties of different monitored FRUs. The page 10 displayed by the browser 8 may include a navigation pane which allows the user to select particular component instances to receive status and property information. Further, the user may select a property of a selected component to monitor, such as the selected component status. The component or FRU status may indicate that the component is in the process of being discovered, discovered but not responding, that the component features are degraded and may require intervention, discovered successfully, component not discovered, component has failed, component has been discovered and functions properly, discovery pending, etc. For instance, if the monitored component is a disk system, then the monitored properties may include disk status, loop status, disk location, disk capacity, world wide name, product ID, etc. Further details of components and their status and properties that may be monitored are described in the "Sun StorEdge Component Manager 2.1 User's Guide", published by Sun Microsystems, Inc. (July 2000), which publication is incorporated herein by reference in its entirety.

Figure 2:
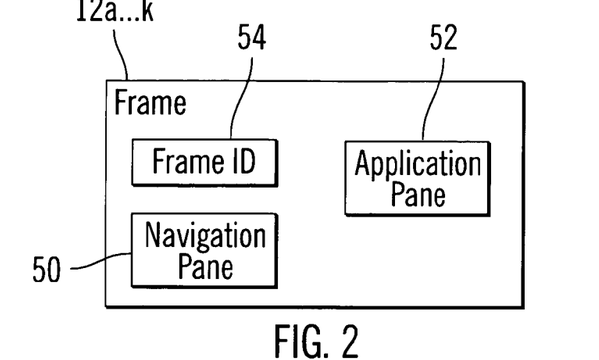
FIGS. 2–5 illustrate data structures utilized to provide updates in accordance with certain implementations of the invention.

FIG. 2 illustrates further details of the frames 12a . . . k in the page 10 rendered in the browser 8. Each frame 12a . . . k includes a navigation pane 50 displaying each instance of a component type. Each frame also includes an application pane 52 to display properties and status for the component instance selected in the navigation pane 50. The frames 12a . . . k may be for the same and/or different component types. For instance, multiple frames can be used to provide status and property information for different selected instances of the same component type, e.g., different selected instances of a disk array, switch, etc. In such case, the page 10 would display status and property information for different instances of the same component type in different frames. Alternatively, there may be multiple frames 12a . . . k providing navigation panes 50 to allow selection of instances of different component types to display in the application pane 52. Each frame 12a . . . k may further include a frame identifier (ID) 54 identifying a frame within the page 10. In certain implementations, the page 10 includes a predetermined number of frames, wherein each frame is defined as associated with a particular component type. Additionally, the user may customize the number of frames displayed and the association of frames with component types to control the component instance properties and status displayed in the frames. Moreover, frames can be used to provide menu items and other system controls, and a separate frame may be used to provide a single navigation pane for the entire page.

Figure 3:
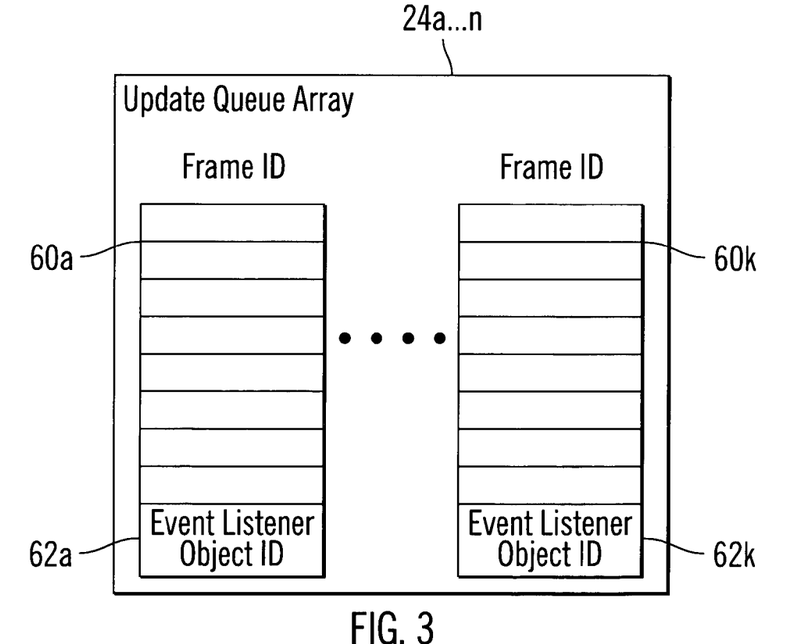

FIG. 3 illustrates further detail of the update queue arrays 24a . . . n as including multiple queues 60a . . . k, one for each frame for which updates are provided. Each queue 60a . . . k would include any new changes to the property or status information displayed in the application pane 52. The update queue array 24a . . . n further identifies in a event listener field 62a . . . k the event listener object 28a . . . j providing content updates to the particular queue 60a . . . k. Moreover, an update queue 60a . . . k may provide updates for multiple frames.

Figure 4:
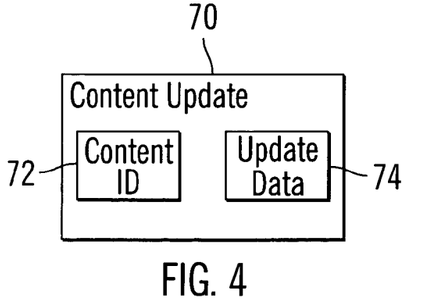

FIG. 4 illustrates a data structure of a content update 70 entry in the queues 60a . . . n. Each content update 70 includes a content identifier (ID) 72 identifying the field in the application pane 52 that is updated with update data 74, which may comprise HTML content, text, graphic images, audio, video, etc.

Figure 5:
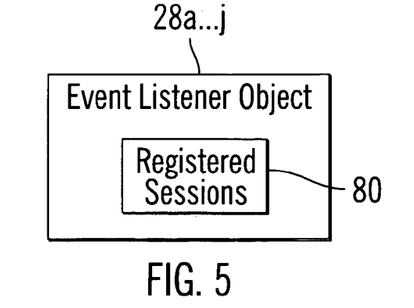

FIG. 5 illustrates the event listener objects 28a . . . j as including registered sessions 80, which comprises a list of all client session objects 22a . . . n registered to receive updates to status and property information for the component instance associated with the event listener object 28a . . . j. If a component type is predefined as always associated with a particular frame 12a . . . k, then the event listener object 28a . . . j would place status and property updates in the queue 60a . . . n associated with that component type. Alternatively, in implementations where the user may customize the component instances represented in the frames 12a . . . k, then the frames 12a . . . k in different client systems may be associated with different component types. In such case, the registered sessions 80 in the event servlet listener 28a . . . . j would indicate both the client session 24*a* . . . *n* and a queue 60*a* . . . *n* in the update queue array 22*a* . . . *n* in which the updates for that event listener 28*a* . . . *j* are placed.

Figure 6:
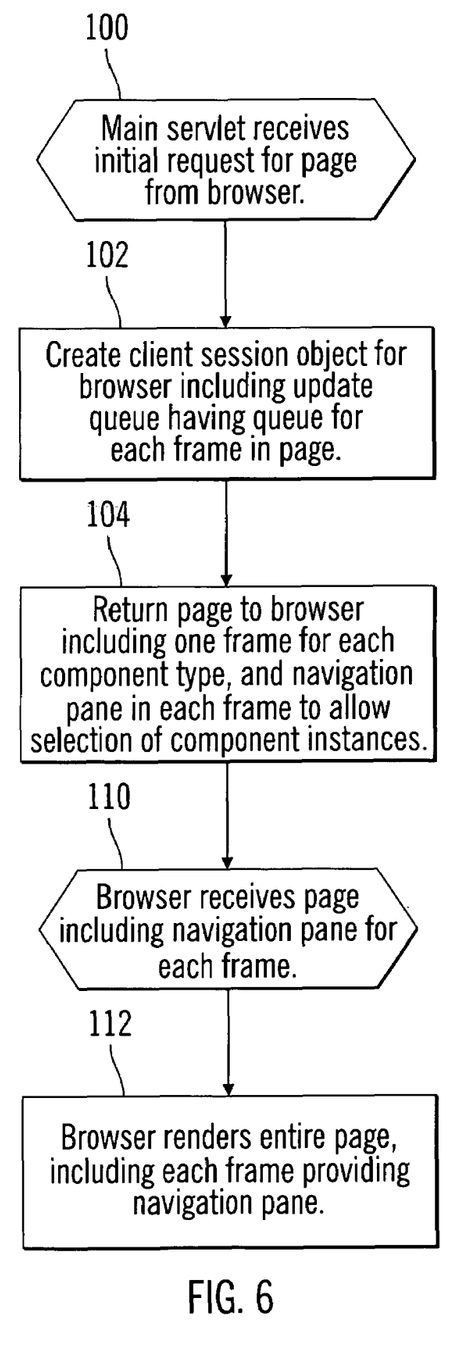
FIGS. 6–11 illustrate logic implemented within program components within the server and client to provide updates in accordance with certain implementations of the invention.

FIGS. 6–11 illustrate logic implemented in the browser 8 and server 6 architecture to provide status and property information to the browser 8. FIG. 6 illustrates logic implemented in the main servlet 20 to respond to an initial request for the page 10 at block 100. In response, the main servlet 20 creates (at block 102) a client session object 22*a* . . . *n* for the requesting browser 8 and an associated update queue array 24*a* . . . *n* including one queue 60*a* . . . *k* for each frame 12*a* . . . *k* in the page 10. As discussed, each frame 12*a* . . . *k* and corresponding queue 60*a* . . . *k* may be permanently associated with a particular type of component, e.g., FRU, disk, switch, etc., or the user may customize how frames 12*a* . . . *k* displayed in the browser page 10 are associated with component types. The main servlet 20 returns (at block 104) the initial page 10 to the browser 8 over the network 4, including a navigation pane 50 for each component type associated with the frame 12*a* . . . *k*. The navigation panes 50 may display all the component instances 32*a* . . . *j* monitored by the server 6.

At block 110, the browser 8 receives the page including the navigation panes 50 for each frame 12*a* . . . *k*. In response, the browser 8 renders (at block 112) the entire page 8 including a navigation pane 50 in each frame 12*a* . . . *k* through which the user may select one component instance 32*a* . . . *j* of the component type associated with the frame.

Figure 7:
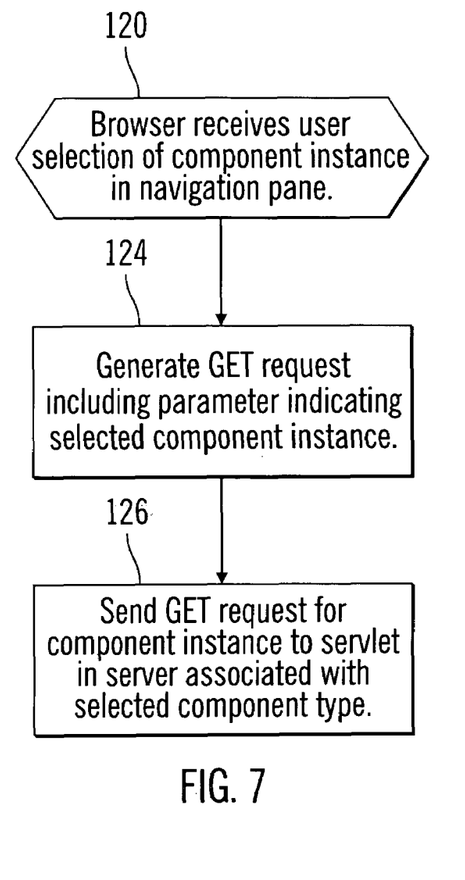

FIG. 7 illustrates logic implemented in the browser 8 in response to receiving (at block 120) user selection of a component instance in the navigation pane 50 of one frame 12*a* . . . *k*. In response, the browser 8 generates (at block 124) an HTTP GET request including a parameter indicating the selected component instance. In one implementation, the HTTP GET request may further specify the URL of the server 6 and servlet 26*a* . . . *m* therein associated with the selected component type. In certain implementations, the URL of the component instances displayed in the navigation pane 50 are maintained in the frame 12*a* . . . *k* so that the browser 8 inserts the URL of the selected component instance into the GET request upon user selection of the component instance in the navigation pane 50. For instance, the URL of the component instances may be embedded in the displayed representation of the component instance, e.g., hypertext link, in the navigation pane 50. The browser 8 then sends (at block 126) the generated GET request to the servlet 26*a* . . . *m* in the server 6.

Figure 8:
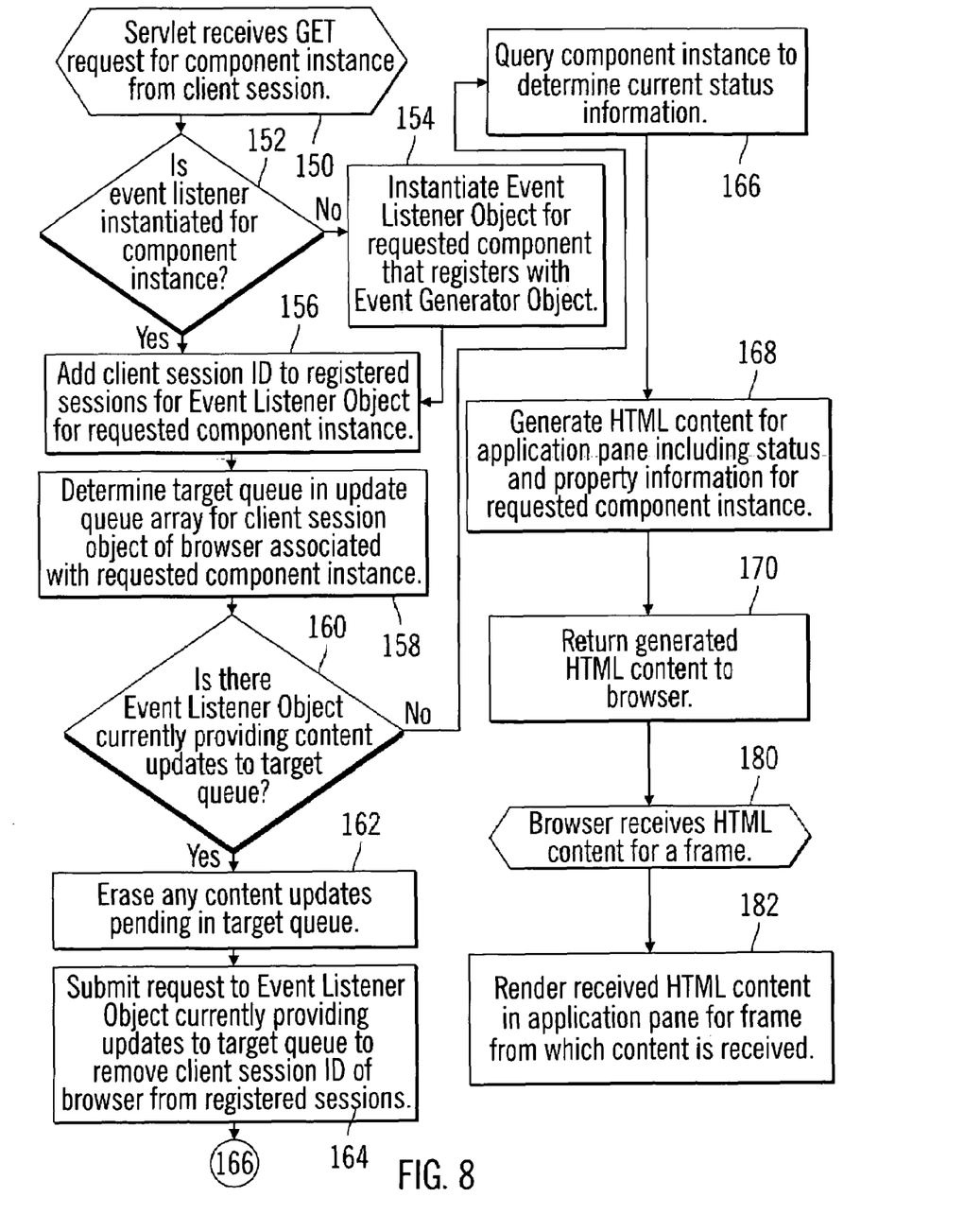

FIG. 8 illustrates logic at blocks 150 to 168 implemented in the servlet 26*a* . . . *m* in response to receiving the GET request for a user selected component at block 150. If (at block 152) an event listener object 28*a* . . . *j* is not already instantiated for the user selected component, then the servlet 26*a* . . . *m* instantiates (at block 154) one event listener object for the requested component. From block 152 or 154, the servlet 26*a* . . . *m* registers the client session object ID of the client 2 initiating the GET request in the registered sessions 80 (FIG. 5) of the event listener object 28*a* . . . *j*. At block 158, the servlet 26*a* . . . *m* determines the target queue 60*a* . . . *k* (FIG. 3) in the update queue array 24*a* . . . *n* assigned to the browser 8 that will hold content updates for the requested component instance. As discussed, frames may be predefined as associated with a particular queue and component type, or the user may dynamically configure frames to be associated with a particular component type.

If (at block 160) there is already an event listener object 28*a* . . . *j* providing updates to the target queue 60*a* . . . *k*, then the servlet 26*a* . . . *m* erases (at block 162) any pending content updates in the target queue 60*a* . . . *k* because the frame 12*a* . . . *k* associated with the target queue 60*a* . . . *k* will now maintain updates for a different component instance. For instance, if a queue 60*a* . . . *k* maintained updates for one instance of a disk array and the user selected in the navigation pane 50 of the frame 12*a* . . . *k* another instance of a disk array, then those pending content updates in the target queue 60*a* . . . *k* are for the previous disk array the user was viewing. The servlet 26*a* . . . *m* then submits a request (at block 162) to the event listener object 28*a* . . . *j* identified in the field 62*a* . . . *k* for the target queue 60*a* . . . *k* associated with the requested component instance to remove the client session ID of the client session object 22*a* . . . *n* associated with the client 2 submitting the GET request from the registered sessions 80 of the event listener object 28*a* . . . *j*. In this way, the event listener object 28*a* . . . *j* associated with the previously selected component instance 32*a* . . . *j* will no longer provide content updates 70 to the target queue 60*a* . . . *k*, which is now queuing content updates 70 for another component instance 32*a* . . . *j*.

From the no branch of block 158 or block 164, the servlet 26*a* . . . *m* proceeds to block 166 to query the requested component instance 32*a* . . . *j* to determine the current status information and properties for the component. The servlet 26*a* . . . *m* then generates (at block 168) content, such as HTML content, for the application pane 52 including the status and property information for the requested component instance 32*a* . . . *j* and returns (at block 170) the generated status and property information to the browser 8 for the frame 12*a* . . . *k* from which the requested component instance was selected.

Blocks 180 and 182 represent logic implemented in the browser 8 upon receiving (at block 180) the HTML content for a frame. In response to receiving the HTML content, the browser 8 renders (at block 182) the received HTML content in the application pane 52 in the frame 12*a* . . . *k*. Both the GET request submitted to the servlet 26*a* . . . *m* (at block 126 in FIG. 7) for the component instance and the received HTML content from the servlet 26*a* . . . *m* may identify the frame 12*a* . . . *k* to include the new property and status information. In this way, the servlet 26*a* . . . *m* provides the data for the selected component instance in response to the user selecting the component instance in the navigation pane 50.

Figure 9:
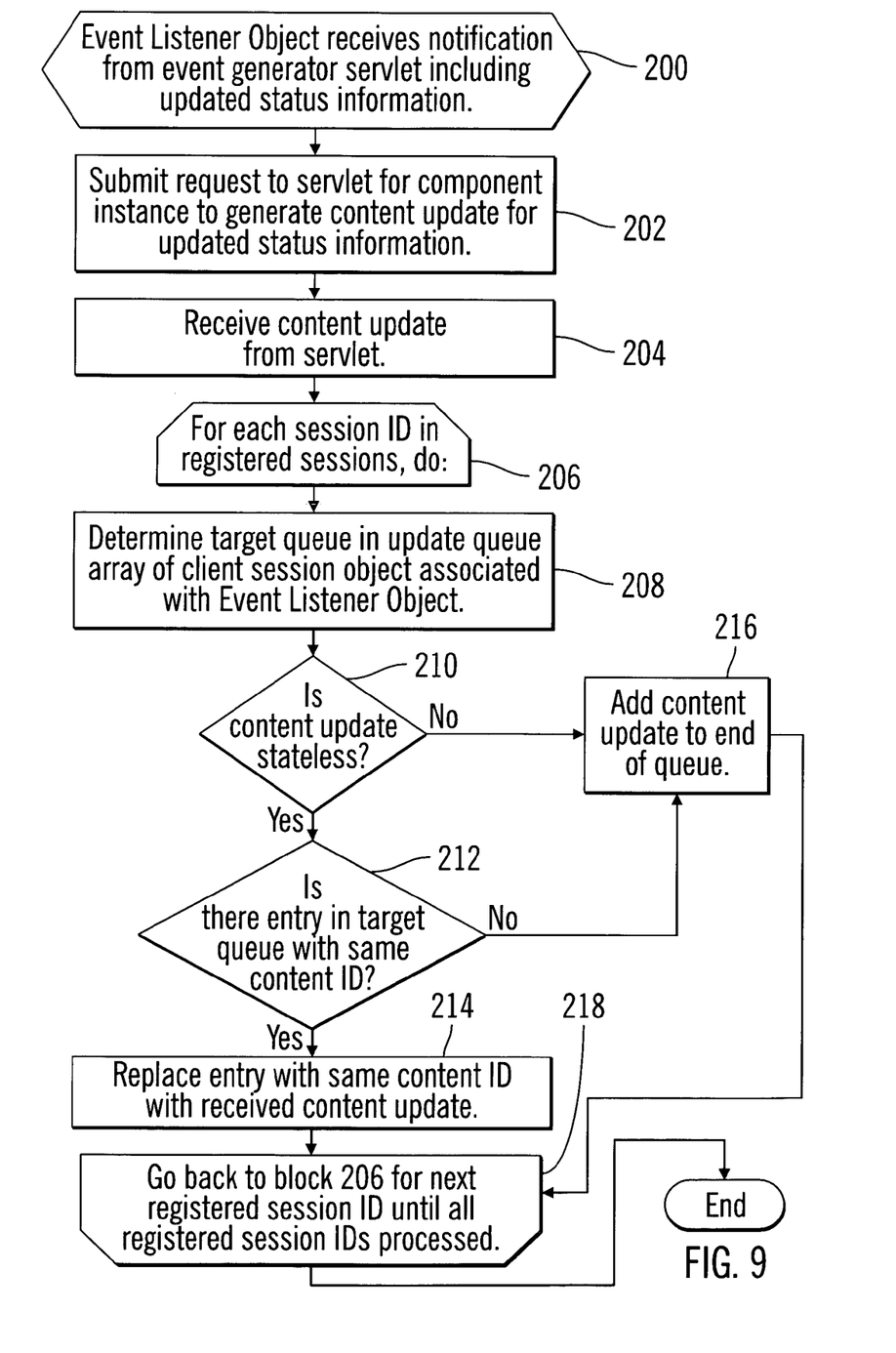

FIG. 9 illustrates logic implemented in the event listener objects 28*a* . . . *j* to provide content updates 70 to the update queue arrays 24*a* . . . *n*. At block 200, one event listener object 28*a* . . . *j* receives notification from an associated event generator object 30*a* . . . *j* including the updated status information for the component instance 32*a* . . . *j* monitored by the event generator object 30*a* . . . *j*. The event generator objects 30*a* . . . *j* monitor the component instances 32*a* . . . *j* for status changes and generate messages to registered event listener objects 28*a* . . . *j* providing information on the status change. The event listener object 28*a* . . . *j* then submits (at block 202) a request to the servlet 26*a* . . . *m* for the monitored component instance, which would be the servlet 26*a* . . . *m* that instantiated the event listener object 28*a* . . . *j*, to generate the content update 70 for the updated status information. As discussed the content update 70 includes the content identifier 72 of the field in the application pane 52 for which the update is provided and the actual update data 74. Upon receiving (at block 204) the content update 70 from the servlet 26*a* . . . *m*, the event listener object 28*a* . . .*j* then performs a loop at blocks 206 through 218 for each client session object ID in the registered sessions 80 list.

At block 208, the event listener object 28a ... j determines the target queue 60a ... k in the update queue array 24a ... n for the registered client session ID associated with the event listener object 28a ... j, i.e., the queue 60a ... k having an event listener object ID field 62a ... k identifying the event listener object 28a ... j providing the content update. A content update 70 can be stateless or stateful. A stateless update is one where the latest update is the only one used, such as a temperature or other status of a component. A stateful content update is one that is accumulated with other content updates of the same type to present a cumulative list of the update information, such as a running log of system activity. If (at block 210) the update data 74 is stateless, then the event listener object 28a ... j determines (at block 212) whether there is a content update 70 in the target queue 60a ... k having the same content identifier (ID) 72 as the content update 70 to add. If so, then the entry with the same content ID 72 is replaced (at block 214) with the new content update 70 to add. Otherwise, if the content update 70 to add is stateful (from the no branch of block 210) or there is no pending content update 70 having the same content ID 72 (from the no branch of block 212), then the new content update 70 is added (at block 216) at the end of the target queue 60a ... k. From block 214 or 216, control proceeds (at block 218) back to block 206 if there are further client session IDs in the registered sessions 80 list.

With the logic of FIG. 9, content updates 70 including updates to status or property fields displayed in the application pane 72 are queued in the update queue array 24a ... n. Additionally, if a frame was displaying a navigation pane or menu items, the updates could provide a new arrangement of menu or navigation items, by removing previously displayed items, adding items, etc.

Figure 10:
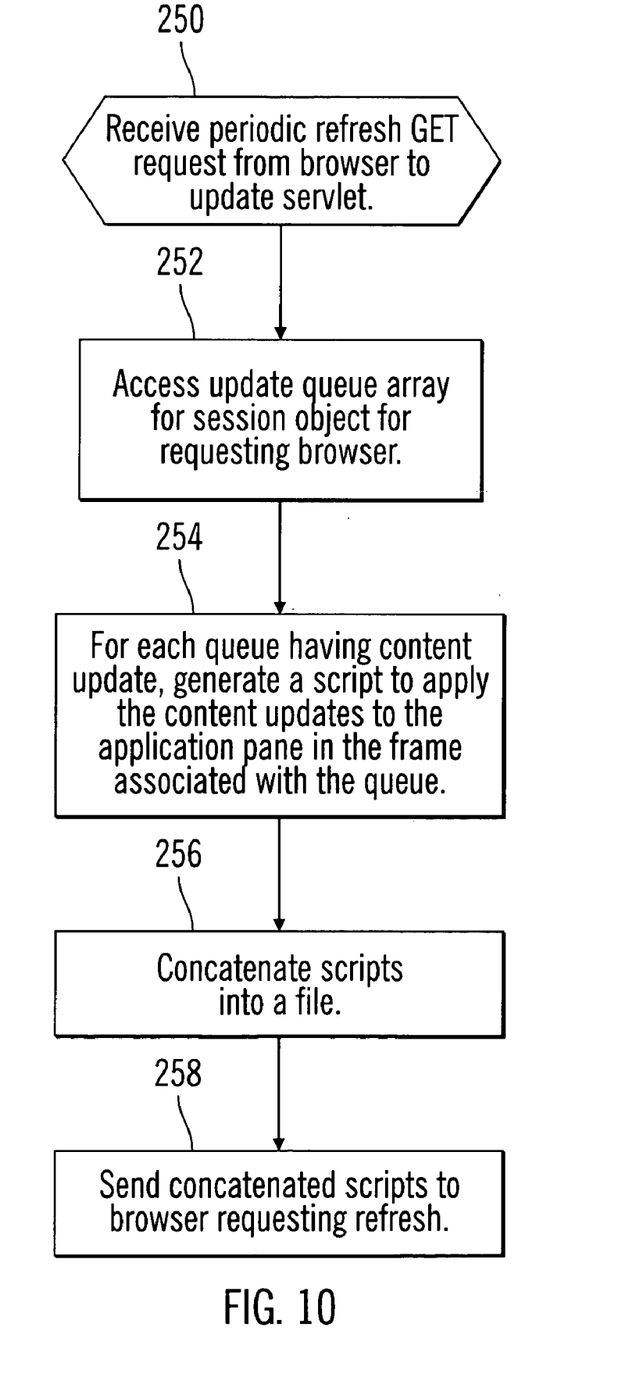

In certain implementations, the page 10 would include a single refresh metatag to provide a GET request to the URL of the update servlet 34 to invoke the refresh operation for all the frames 12a ... k in the page 10. With the described implementations, a single refresh metatag is used to refresh all the frames. FIG. 10 illustrates logic implemented in the update servlet 34 to handle HTTP GET requests for a refresh of current updates to the page 10. At block 250, the update servlet 34 receives a GET request from the browser 8. In response, the update servlet 34 accesses (at block 252) the update queue array 24a ... n of the client session object 22a ... n associated with the client 2. For each queue 60a ... k having content updates 70, the update servlet 34 generates (at block 254) a script or small program to apply the content updates to the application pane 52 in the frame 12a ... k associated with the queue 60a ... k including the content updates 70. The update servlet 34 then concatenates (at block 256) all the scripts from the different queues 60a ... k into a single stream or file and sends (at block 258) the stream or file of concatenated scripts to the browser 8 that sent the refresh GET request.

Figure 11:
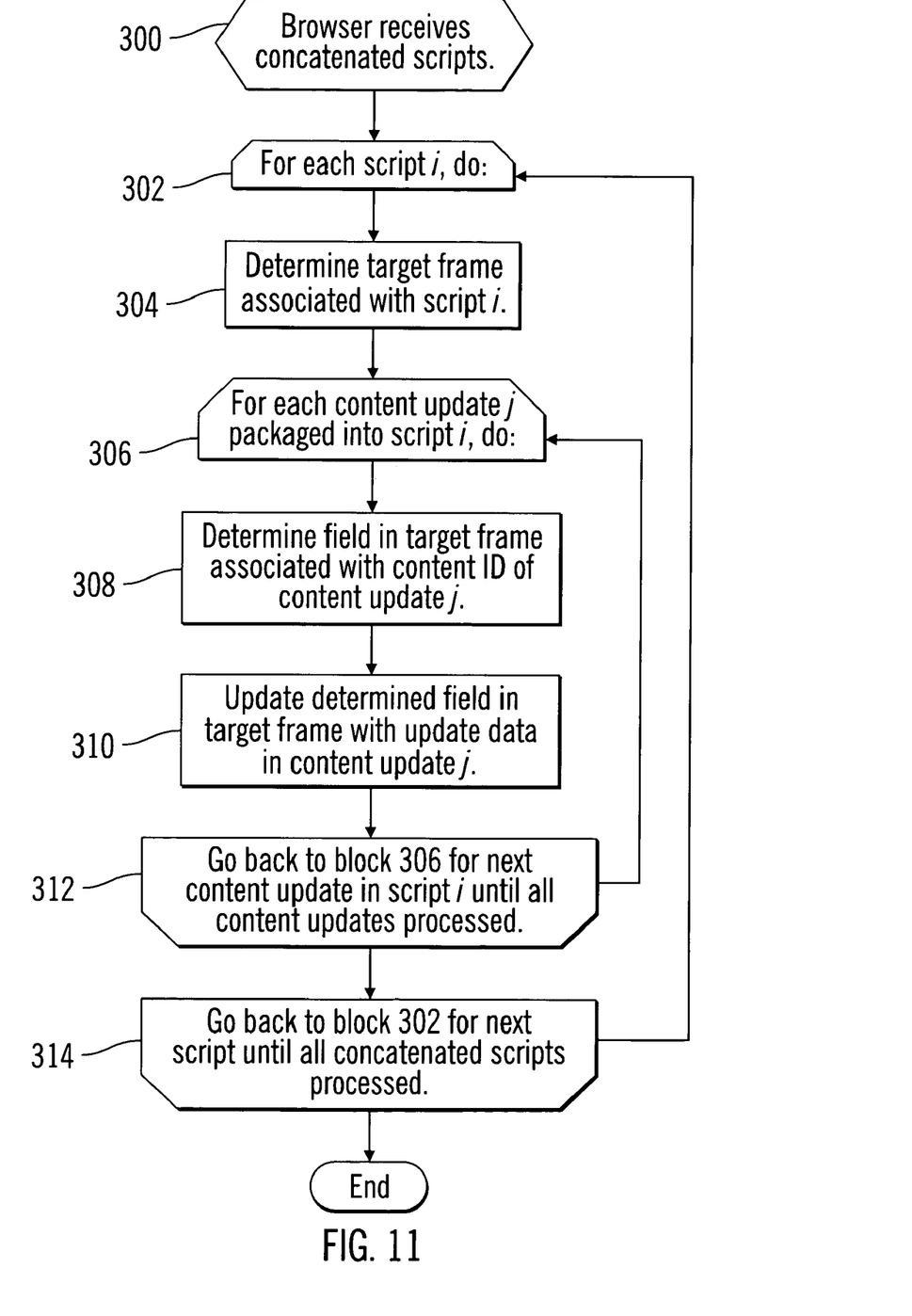

FIG. 11 illustrates logic embedded in the code of the concatenated scripts to cause the browser 8 to update specific fields in application panes 52 of the frames 12a ... k with the update data 74 in the content updates 70 packaged into the concatenated scripts. Control begins at block 300 with the browser 8 receiving the concatenated scripts of content updates 70. The browser 8 then performs a loop at block 302 through 314 for each script i in the concatenated group of scripts. For each script i, the browser 8 determines (at block 304) the target frame 12a ... k associated with script i. Each script i may include a frame ID indicating the frame in the browser 8 to apply the content updates 70 in the script. Alternatively, the ordering of the concatenated scripts may be used to determine the frame to receive the content updates 70 in the script, where an empty script is used to indicate that there are no updates for the corresponding frame 12a ... k.

The browser 8 then performs a loop at block 306 through 316 for each content update j in script i to update the frame 12a ... k associated with the queue 60a ... k including the content updates 70 packaged into script i. At block 308, the browser 8 determines the field in the target frame 12a ... k associated with the content ID 72 of content update j. The content ID may identify a property or status field displayed in the application pane 70 of the target frame 12a ... k. The browser 8 then updates (at block 310) the determined field in the target frame with the update data 74 in content update j. In this way, the concatenated scripts include code to cause the browser 8 to apply updates to only those fields in the application panes 52 for which new property or status information is available.

Figure 12:
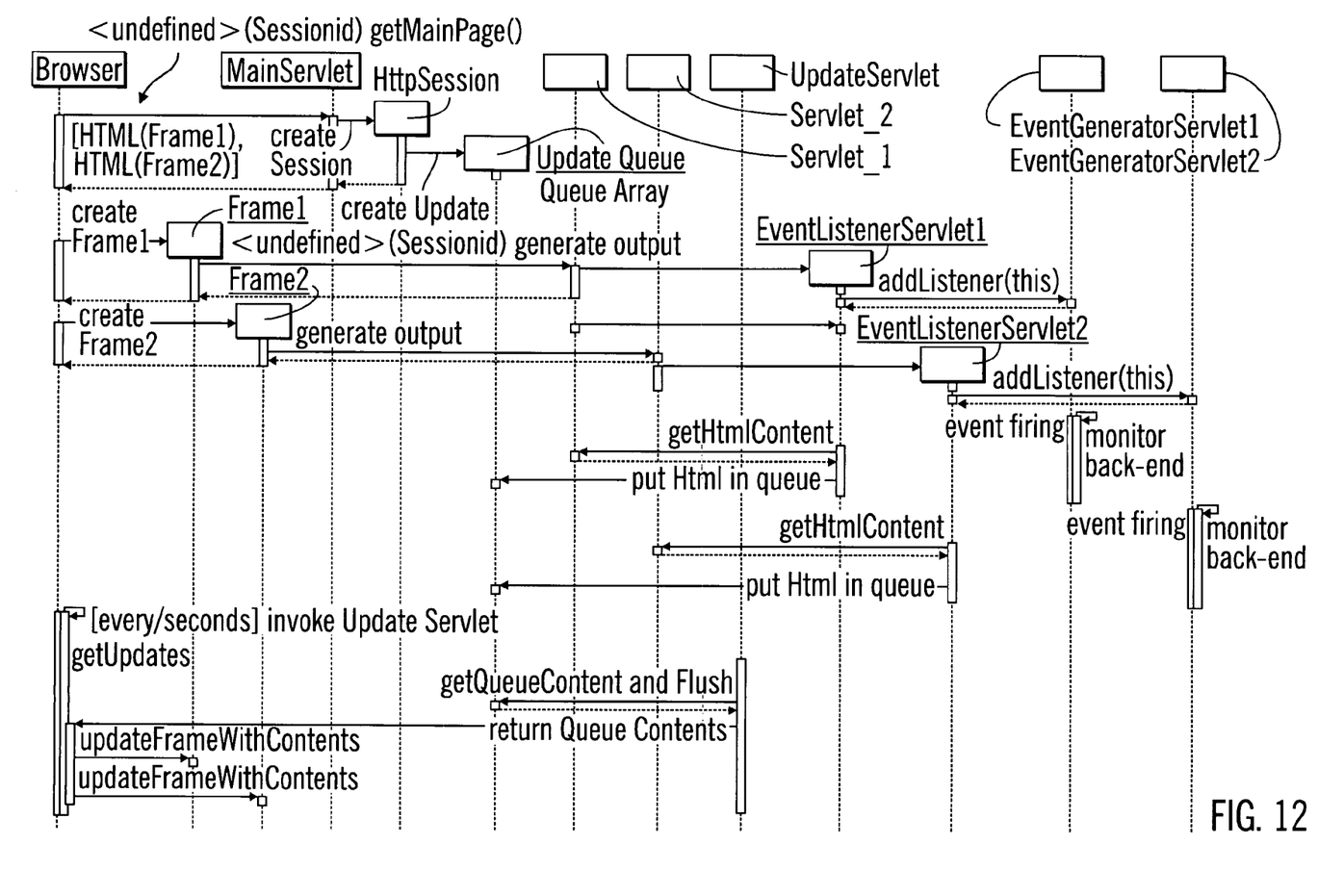
FIG. 12 illustrates a state sequence diagram illustrating how the program components in the client and server communicate and provide update data in accordance with certain implementations of the invention.

FIG. 12 illustrates a sequence diagram illustrating the operations described with respect to FIGS. 6–12 for an architecture in which there are two frames, servlets, event listener objects, and event generator objects.

Figure 13:
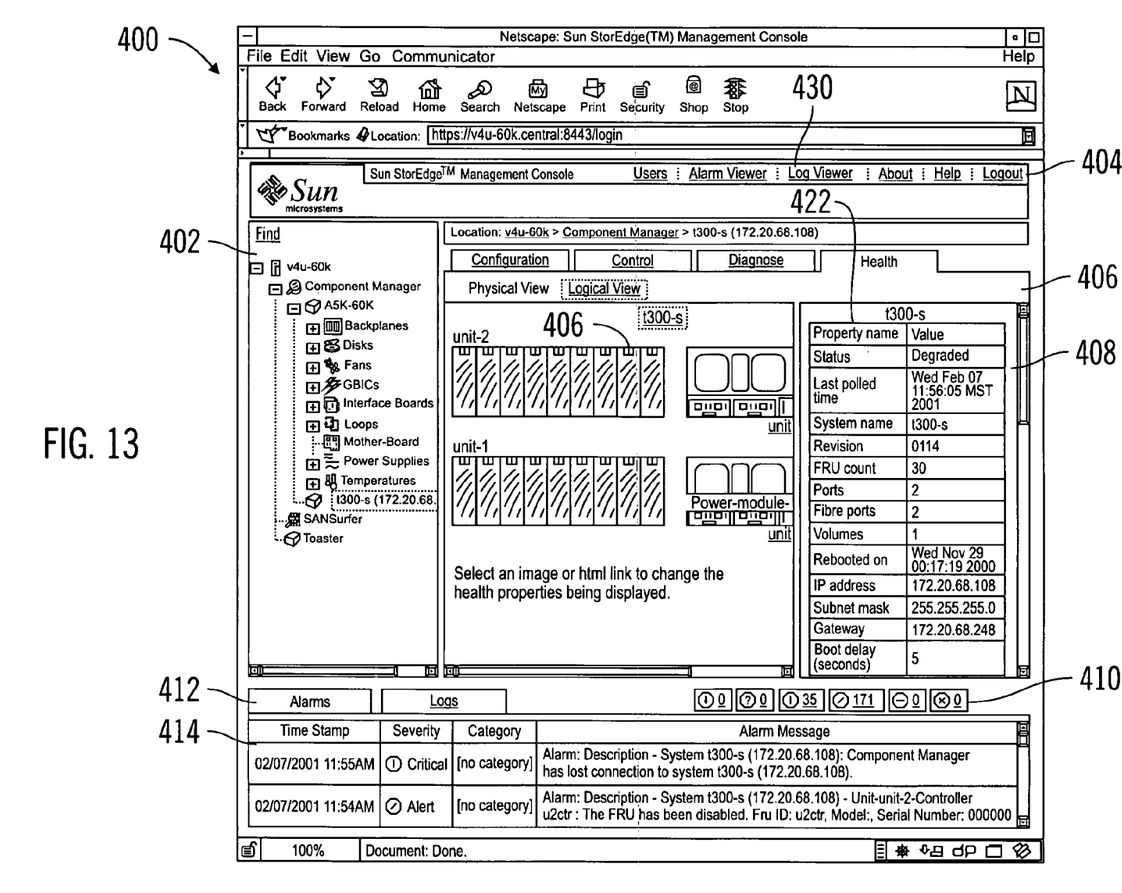

FIG. 13 illustrates an example of a graphical user interface page 400 displaying frames in accordance with implementations of the invention. The page 400 includes multiple HTML frames, including a navigation frame 402, a menu frame 404, a tab frame 406, an application frame 408, an alarm counter frame 410, an alarm tab frame 412 and an alarm log frame 414. Each of these frames 400, 402, 404, 406, 408, 410, 412, and 414 may receive data and updates from a separate servlet, such as servlets 26a ... m in FIG. 1, in the manner described above. The navigation frame 402 displays the component instances the user may select to cause the display of status and properties for the selected component in the application frame 408, including graphical representations 420 of the component and a property table 422. Selection of one of the hypertext links in the menu frame 404, tab frame 406, and alarm tab frame 412 would cause the display of another window including data displayed in one or more frames that have one or more underlying servlets in the server 6 providing data and updates in the manner described above.

In the implementation of FIG. 13, there is only one navigation frame and multiple frames providing further information, such as alarm information, and menus to access yet further pages of frames. For instance, selection of the log viewer menu item 430 in the page 400 would cause the display of the log viewer page 450 shown in FIG. 14. The log viewer page 450 includes two frames 452 and 454, which in one implementation are supported by a single log viewer servlet in the server 6, which would provide data and updates to the frames 452 and 454 in the manner described above.

With the above described architecture and logic, the server 6 transfers only the data needed to update those fields or areas of the page 10 having new data. This technique optimizes network bandwidth and server load because only new updated data is transferred in response to a refresh request, instead of transferring the entire page content. Further, by minimizing the data transferred as part of a refresh update, the transfer time is optimized because the amount of data transferred is minimized, thereby reducing any delays in providing data updates to the page 8 in the browser. Yet further, the rendering operations by the browser 8 to update the page 10 frames 12a ... k with the update data is minimized because the browser 8 need only update those fields in the page for which update data is supplied. The browser 8 does not have to redraw the entire page contents in the page.

Moreover, the described implementations utilize only a single refresh request to access updates for all the frames in the page, as opposed to certain prior art techniques that include a separate refresh metatag in each frame to require separate requests to update the data in each frame. The described implementations thus further conserve network bandwidth and server load by not submitting multiple refresh or GET requests to obtain the updates for each separate frame, but instead utilizes only a single communication or request to obtain the updates for all the frames.

ADDITIONAL IMPLEMENTATION DETAILS

The described implementations may comprise a method, apparatus, program or article of manufacture using standard programming and/or engineering techniques to produce software, firmware, hardware, or any combination thereof. The programs defining the functions of the described implementations can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative implementations of the present invention.

The described implementations included a web browser displaying a web page having multiple HTML frames that may render in separate window content from different sources. The frames are not limited to HTML frames, and may utilize any windowing or framing technology known in the art which allows content from different source locations to be downloaded and rendered in different regions of a browser or viewer main window.

The described implementations discussed web browsers capable of rendering HTML or XML data. Additionally, the described web browser may be capable of rendering data in any type of media format, and is not limited to rendering mark-up language formats, such as HTML, XML, etc.

The property and status information provided to the browser may be in any media format including HTML, XML, video, audio, still images, three-dimensional images, etc.

The described implementations utilized only a single refresh request to obtain the updates for all the frames in the page. In alternative implementations, multiple refresh metatags may be embedded in the page to perform separate refresh operations for different frames, thereby not using a single refresh for all the frames.

The described implementations utilized a browser program, such as a web browser capable of rendering HTML and other markup language content. However, any presentation program capable of rendering content in any media format may be used to render the state changes supplied by the server.

The described implementations utilized different servlets to perform discrete operations in terms of monitoring for status changes, supplying status changes to an update queue, and responding to refresh requests. Those skilled in the art will recognize that functions described with respect to certain of the servlets may be combined in fewer servlets or dispersed throughout additional servlets. Thus, the functions and operations described herein are not limited to the servlet architecture shown in FIG. 1. Further, program components other than Java servlets may be used to perform the functions described with respect to the servlets shown in FIG. 1 and described with respect to FIGS. 6–12.

In the described implementations, all of the objects and servlets used to provide updates to the client browser were described as implemented on a single sever 6. In alternative implementations, the objects and servlets described herein may be implemented on different computer systems and servers according to a distributed application architecture known in the art. For instance, the servlets and objects may be implemented in the Sun Microsystem's JIRO architecture where distributed servlets and objects are registered with a lookup service and communicate using proxy objects accessed through the lookup service.

In the described implementations, update data was provided to the client browser in response to GET requests submitted to the server 6, whereby the client pulls the updates from the server 6. In alternative implementations, the queued updates may be pushed from the server 6 to the client 6 to render in the browser 8.

In the described implementations, the client 2 and server 6 comprised separate computer systems. In alternative implementations, the client and server may comprise program entities implemented on the same computer platform.

In the described implementations, the client and server used the HTTP protocol to communicate. In alternative implementations, the client and server may use any communication or messaging protocol known in the art to communicate.

The described implementations were used to provide status and property information for system components, such as databases, disk drives, switches. In alternative embodiments, the described implementations may be used to provide updates to any type of dynamic data in a page, not just system components as described herein. For instance, the component instances may comprise different fields of dynamic information. Still further, the dynamic data displayed in a frame may comprise menu items, a navigation pane, or any other types of data or GUI controls known in the art.

Preferred embodiments described particular settings that the content provider may configure in the search instruction file 20. In further embodiments, the content provider 2 may configure different types of settings than those described herein to provide additional levels of control over how the collection tool 6 searches Web pages and the metadata returned.

The preferred logic of FIGS. 6–11 describes specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing data updates to a page, wherein the page includes multiple regions of dynamic content, wherein the regions and the page are displayed within a presentation program executing on a client, wherein a server transfers the page to the client over a network, and wherein the server performs:
   detecting state changes;
   queuing information on the state changes, by:
      i) maintaining one client session object for each client that has received one page; and
      ii) maintaining a plurality of queues for each client session object to queue information on state changes rendered in the regions of the page, wherein a plurality of queues are associated with client session objects, and wherein the plurality of queues associated with each one client session object include state change information for regions in the page sent to the client;
   receiving a refresh request from one client;
   determining the client session object for the one client submitting the refresh request;
   determining a queue from the plurality of queues for the determined client session object;
   returning to the requesting one client state change information from the determined queue to render in at least one region in the page by:
      i) generating an update package including content indicating the detected state changes;
      ii) sending the update package to the client, wherein the presentation program in the client renders the content in the update package in at least one region;
      wherein the refresh request indicates one region in the page, and wherein determining the queue for the determined client session object further comprises:
         determining the queue for the client session object that includes state change information for the region indicated in the refresh request.

2. The method of claim 1, wherein the update package is generated and sent to the client computer in response to a request from the client computer.

3. The method of claim 2, wherein the presentation program comprises a web browser and wherein the request comprises a HyperText Transfer Protocol (HTTP) request.

4. The method of claim 1, wherein queuing information on the state changes further comprises:
   maintaining one update queue for at least one region of dynamic content that is capable of being displayed in the presentation program, wherein the update queue includes state change information to be rendered in the at least one region associated with the update queue.

5. The method of claim 4, further comprising:
   providing an event listener capable of detecting state changes, wherein one event listener is associated with the update queue;
   detecting, with the event listener, a state change; and
   adding, with the event listener, information on the state change to the update queue associated with the event listener.

6. The method of claim 5, wherein one event listener and associated update queue provide state change information for one instance of a component type, wherein the region associated with the update queue renders information in the client presentation program on the instance of the component type.

7. The method of claim 4, further comprising:
   providing one servlet for each monitored component type; and
   instantiating, with the servlet, one event listener for each instance of the component type.

8. The method of claim 4, wherein the at least one region and the corresponding update queue provide state change information for one component type.

9. The method of claim 1, further comprising:
   receiving a client request for the page;
   generating a client session object for the client request; and
   generating an update queue array for the client session object including one update queue for the regions of dynamic content in the page.

10. The method of claim 9, further comprising:
    receiving a client request for information on a requested component instance from one region of the page; and
    registering the client session with an event listener providing state change information for the requested component instance, wherein the event listener adds state change information to one update queue for the component type in the update queue array for the registered client session.

11. The method of claim 10, further comprising:
    determining one event listener providing state change information to the update queue for an instance of the component type other than the requested instance of the component type; and
    submitting a request to the determined event listener to unregister the client session for the client submitting the client request.

12. A system for providing data updates to a page, wherein the page includes multiple regions of dynamic content, wherein the regions and the page are displayed within a presentation program executing on a client, comprising:
    a processing unit;
    a network connection enabling the processing unit to transfer the page to the client over a network;
    a memory device; and
    a computer readable medium including code executed by the processing unit to perform:
       detecting state changes;
       queuing information on the state changes in the memory device by:
          i) maintaining one client session object for each client that has received one page; and
          ii) maintaining a plurality of queues for each client session object to queue information on state changes rendered in the regions of the page, wherein a plurality of queues are associated with client session objects, and wherein the plurality of queues associated with each one client session object include state change information for regions in the page sent to the client;
       receiving a refresh request from one client;
       determining the client session object for the one client submitting the refresh request;
       determining a queue from the plurality of queues for the determined client session object;

returning to the requesting one client state change information from the determined queue to render in at least one region in the page by:
  i) generating an update package including content indicating the detected state changes;
  ii) sending the update package to the client, wherein the presentation program in the client renders the content in the update package in at least one region;
  wherein the refresh, request indicates one region in the page, and wherein determining the queue for the determined client session object further comprises:
  determining the queue for the client session object that includes state change information for the region indicated in the refresh request.

13. The system of claim 12, wherein the processing unit executes the code to further perform:
  receiving a client request for the page;
  generating a client session object for the client request; and
  generating an update queue array in the memory device for the client session object including one update queue for the regions of dynamic content in the page.

14. The system of claim 13, wherein the processing unit executes the code to further perform:
  receiving a client request for information on a requested component instance from one region of the page; and
  registering the client session with an event listener providing state change information for the requested component instance, wherein the event listener adds state change information to one update queue for the component type in the update queue array for the registered client session.

15. The system of claim 14, wherein the processing unit executes the code to further perform:
  determining one event listener providing state change information to the update queue for an instance of the component type other than the requested instance of the component type; and
  submitting a request to the determined event listener to unregister the client session for the client submitting the client request.

16. A system for providing data updates to a page, wherein the page includes multiple regions of dynamic content, wherein the regions and the page are displayed within a presentation program executing on a client, wherein a server transfers the page to the client over a network, comprising:
  means for detecting state changes;
  means for queuing information on the state changes by:
    i) maintaining one client session object for each client that has received one page; and
    ii) maintaining, a plurality of queues for each client session object to queue information on state changes rendered in the regions of the page, wherein a plurality of queues are associated with client session object, wherein the plurality of queues associated with each one client session object include state change information for regions in the page sent to the client;
  means for receiving a refresh request from one client;
  means for determining the client session object for the one client submitting the refresh request;
  means for determining a queue from the plurality of queues for the determined client session object;
  means for returning to the requesting one client state change information from the determined queue to render in at least one region in the page by:
    i) generating an update package including content indicating, the detected state changes:
    ii) sending the update package to the client, wherein the presentation program in the client renders the content in the update package in at least one region;
    wherein the refresh request indicates one region in the page, and wherein determining the queue for the determined client session object further comprises:
    means for determining the queue for the client session object that includes state change information for the region indicated in the refresh request.

17. The system of claim 16, further comprising:
  means for receiving a client request for the page;
  means for generating a client session object for the client request; and
  means for generating an update queue array for the client session object including one update queue for the regions of dynamic content in the page.

18. The system of claim 17, further comprising:
  means for receiving a client request for information on a requested component instance from one region of the page; and
  means for registering the client session with an event listener providing state change information for the requested component instance, wherein the event listener adds state change information to one update queue for the component type in the update queue array for the registered client session.

19. The system of claim 18, further comprising:
  means for determining one event listener providing state change information to the update queue for an instance of the component type other than the requested instance of the component type; and
  means for submitting a request to the determined event listener to unregister the client session for the client submitting the client request.

20. An article of manufacture for providing data updates to a page, wherein the page includes multiple regions of dynamic content that may be separately updated independently of each other, wherein the regions and the page are displayed within a presentation program executing on a client, wherein a server transfers the page to the client over a network, and wherein the article of manufacture causes operations to be performed, the operations comprising:
  detecting state changes;
  queuing information on the state changes by:
    i) maintaining one client session object for each client that has received one page; and
    ii) maintaining a plurality of queues for each client session object to queue in formation on state changes rendered in the regions of the page, wherein a plurality of queues are associated with client session objects, and wherein the plurality of queues associated with each client session object include state change information for regions in the page sent to the client;
  receiving a refresh request from one client;
  determining the client session object for the one client submitting the refresh request;
  determining a queue from the plurality of queues for the determined client session object;
  returning to the requesting one client state change information from the determined queue to render in at least one region in the page by:
    i) generating an update package including content indicating, the detected state changes;

ii) sending the update package including content indicating presentation program in the client renders the content in the update package in at least one region;
wherein the refresh request indicates one region in the page and wherein determining the queue for the determined client session object further comprises:
determining the queue for the client session object that includes state change information for the region indicated, in the refresh request.

21. The article of manufacture of claim 20, wherein queuing information on the state changes further comprises:
maintaining one update queue for at least one region of dynamic content that is capable of being displayed in the presentation program, wherein the update queue includes state change information to be rendered in the at least one region associated with the update queue.

22. The article of manufacture of claim 21, further comprising:
providing an event listener capable of detecting state changes, wherein one event listener is associated with the update queue;
detecting, with the event listener, a state change; and
adding, with the event listener, information on the state change to the update queue associated with the event listener.

23. The article of manufacture of claim 22, wherein one event listener and associated update queue provide state change information for one instance of a component type, wherein the region associated with the update queue renders information in the client presentation program on the instance of the component type.

24. The article of manufacture of claim 21, further comprising:
providing one servlet for each monitored component type; and
instantiating, with the serviet, one event listener for each instance of the component type.

25. The article of manufacture of claim 21, wherein the at least one region and the corresponding update queue provide state change information for one component type.

26. The article of manufacture of claim 20, further comprising:
receiving a client request for the page;
generating a client session object for the client request; and
generating an update queue array for the client session object including one update queue for the regions of dynamic content in the page.

27. The article of manufacture of claim 26, further comprising:
receiving a client request for information on a requested component instance from one region of the page; and
registering the client session with an event listener providing state change information for the requested component instance, wherein the event listener adds state change information to one update queue for the component type in the update queue array for the registered client session.

28. The article of manufacture of claim 27, further comprising:
determining one event listener providing state change information to the update queue for an instance of the component type other than the requested instance of the component type; and
submitting a request to the determined event listener to unregister the client session for the client submitting the client request.

* * * * *